Figure 1:
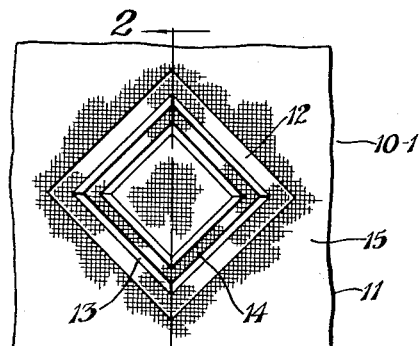

July 18, 1933.  E. E. GEORGE  1,919,059

METHOD OF MAKING EMBOSSED FABRIC

Filed Jan. 15, 1932

Inventor
E. E. George
By Frease and Bishop Attorneys

Patented July 18, 1933

1,919,059

UNITED STATES PATENT OFFICE

EDGAR E. GEORGE, OF CANTON, OHIO, ASSIGNOR TO THE BUTTONLESS TIRE COVER COMPANY, OF CANTON, OHIO, A CORPORATION OF OHIO

METHOD OF MAKING EMBOSSED FABRIC

Application filed January 15, 1932. Serial No. 586,941.

My invention relates to fabric products which include embossed portions comprising raised characters and/or configurations which may comprise designs, monograms, reading matter, and the like.

Such embossed fabric products are used, for example, in large quantities in the form of automobile tire covers in which the embossing may include the name, trade-mark, or design of the tire maker, or dealer, or automobile sales garage, or the like.

Fabrics used for making embossed tire covers include for the most part pyroxylin coated fabrics, enamel coated fabrics, and textile fabrics.

The embossing of pyroxylin coated fabrics has been practiced for some time by the trade generally; and in my prior application for patent Serial No. 409,306, filed November 23, 1929, since matured in Letters Patent No. 1,852,964, on April 5, 1932, and in the divisional application thereof, Serial No. 576,755, filed November 23, 1931, each entitled Embossed coated fabrics and methods of making the same, I have set forth improved methods which are particularly adapted for producing enamel coated fabrics, and which may also be used for producing embossed textile fabrics.

The particular objects of the present improvements include the provision of an improved embossed textile fabric product, and an improved method for embossing fabrics, which is particularly adapted for producing embossed textile products, and which includes different steps than the method set forth in my aforesaid prior applications, and the use of the present improved method resulting in improved products as compared with the products of my prior applications, particularly in the case of embossed textile fabric products.

The foregoing and other objects are attained by the methods which comprise the present invention, and which are particularly and distinctly pointed out and set forth in the appended claims forming part hereof, and which are furthermore set forth in the following statement and description of the preferred steps of my improved methods of making embossed fabric products.

In general terms, an embossed fabric product made by the methods claimed herein may be described as including a fabric piece having embossed portions pre-formed therein, and a coating or shell of material preferably thermo-plastically applied on the embossed portions, the coating or shell of thermo-plastic material being preferably applied upon the outer or exposed surface of the pre-embossed fabric, whereby a superior and attractive appearance is attained in the finished embossed fabric product.

The improved embossed fabric product is preferably made by the use of the improved method hereof, which may be described in general terms as including the following steps: First, preforming embossed portions in a fabric piece, preferably by embossing the fabric piece between heated dies under pressure; second, applying a coating of thermo-plastic material preferably upon the outer or exposed surface of the embossed portions of the fabric piece; and third, applying pressure and heat to the coated embossed fabric, preferably by a repressing operation between the embossing dies, or in other words, by hot pressing the thermo-plastically coated embossed fabric.

Figure 2:
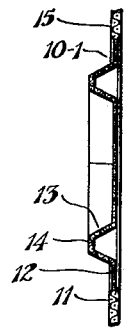
Figure 3:
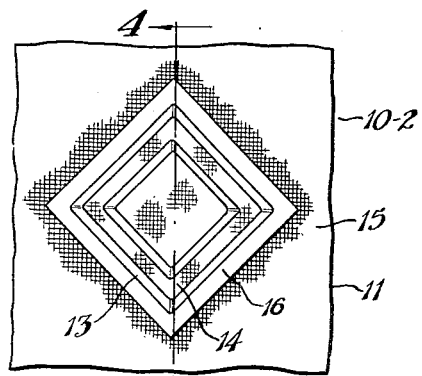
Figure 4:
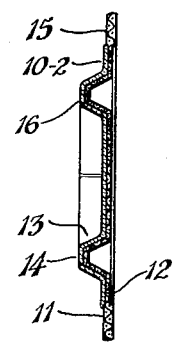
Figure 5:
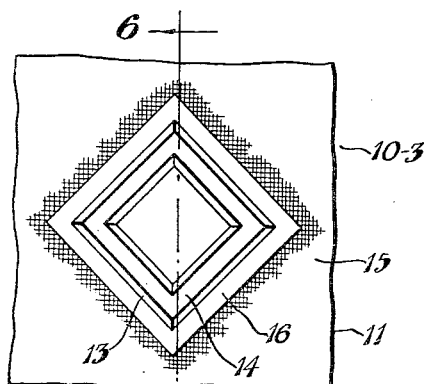
Figure 6:
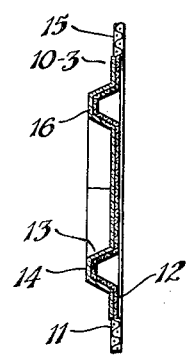

A preferred embodiment of the improved fabric product, as it appears successively after carrying out the several steps of the improved method, is illustrated in the accompanying drawing forming part hereof, in which Figure 1 is a view looking towards the surface normally presented to the eye of an embossed fabric piece, after carrying out the first step of the improved method;

Fig. 2, a sectional view thereof as on line 2—2, Fig. 1;

Fig. 3, a view, similar to Fig. 1 illustrating the embossed fabric piece after carrying out the second step of the improved method hereof;

Fig. 4, a sectional view thereof as on line 4—4, Fig. 3;

Fig. 5, a view, similar to Figs. 1 and 3, illustrating the finished improved embossed fabric product; and Fig. 6, a sectional view thereof as on line 6—6, Fig. 5.

Similar numerals refer to similar parts throughout the drawing.

In Figs. 1 and 2 is illustrated an embossed fabric piece indicated generally by 10—1, resulting from the carrying out of the first step of the improved method, by which a fabric piece 11 has formed therein embossed portions 12, preferably by compressing and embossing the portions 12 of the fabric piece 11 between heated embossing dies, and as illustrated the fabric piece 11 consists of textile fabric, as received from the mill without any external coating.

As may be clearly seen in Fig. 2, the embossed portions 12 are preferably compressed so that the thickness of the portions 12 is less than the thickness of the remaining portions of the fabric piece 11.

Such reduction in the thickness of the embossed portions 12 very materially facilitates the attainment of sharp corners on angular embossed portions, such as the illustrated embossed portions 12, which comprise a square ridge 13, the top 14 of which is elevated from the normally outer surface 15 of the fabric piece 11.

In more complicated designs including relatively minute detail, the simultaneous embossing and compressing of the embossed portions constituting the preferred first step of my improved method, facilitates the bringing out of said minute detail.

In Figs. 3 and 4, the embossed fabric piece is indicated generally by 10—2, after carrying out the second step of the improved method, by which a thermo-plastic coating or shell 16 has been applied preferably to the normally outer surface of the embossed portions 12. The coating or shell 16 is preferably thermoplastic, self-hardening upon cooling, substantially non-peeling, and having substantially constant flexibility, and may be made from lacquer, glue, or celluloid, in liquid, powdered, or sheet form.

If the shell 16 is made from the liquid or powdered form of the thermo-plastic material, the liquid may be sprayed or the powder may be dusted directly upon the surface of the embossed portions.

If the shell 16 is made from the sheet form of the thermo-plastic material, it may be pre-formed between embossing dies before application to the pre-embossed and compressed fabric piece 10—1.

On the other hand, if the sheet form of thermo-plastic material is utilized, a sheet of flat thermo-plastic material may be laid directly upon the pre-embossed fabric piece 10—1, without necessarily pre-forming the flat sheet of thermo-plastic material.

In Figs. 5 and 6, the finished embossed fabric piece is indicated generally by 10—3, after carrying out the third step of the improved method, by which the pre-formed embossed fabric portions 12, with the thermoplastic coating or shell 16 applied thereto, have been re-pressed between the preferably heated dies which were used to pre-form the embossed fabric portions 12, whereby the usually transparent coating or shell 16 is densified and darkened in color by the action of the heat and is thermo-plastically engaged with and impregnates the pre-formed embossed fabric portions 12.

Furthermore the final re-pressing operation serves to further bring out the detail of the design on the outer surface of the shell 16 when the same is placed on the outer side of the pre-formed embossed fabric portions 12.

The coating or shell 16 may be applied upon the normally unexposed side of the pre-formed embossed fabric portions 12, but for the purpose of improving the external appearance of the design, by densifying the same and forming clear cut details, as aforesaid, it is preferred to apply the thermoplastic coating or shell 16 upon the outer or normally exposed side of the pre-formed embossed fabric portions 12.

Accordingly by the use of the present improved method, a finished embossed fabric product is obtained, which has a very superior appearance, particularly when the pre-embossed fabric base is made from textile fabric, for the embossing of which the improved method is particularly adapted.

I claim:

1. The method of making embossed fabric products, which includes forming embossed portions in a fabric piece, and hot pressing a coating of thermo-plastic material on the embossed portions.

2. The method of making embossed fabric products, which includes forming embossed portions in a fabric piece, applying a coating of thermo-plastic material on the embossed portions, and applying pressure and heat to the coated embossed portions.

3. The method of making embossed fabric products, which includes forming compressed and embossed portions in a fabric piece, and hot pressing a coating of thermo-plastic material on the compressed and embossed portions.

4. The method of making embossed fabric products, which includes forming compressed and embossed portions in a fabric piece, applying a coating of thermo-plastic material on the compressed and embossed portions, and applying pressure and heat to the coated compressed and embossed portions.

EDGAR E. GEORGE.